Jan. 7, 1969    W. E. TREVATHAN    3,420,124
PIPE FITTING MACHINE
Filed April 6, 1966    Sheet 1 of 6

INVENTOR.
WALTER E. TREVATHAN
BY John R. Walker, III
Attorney

Jan. 7, 1969

W. E. TREVATHAN 3,420,124

PIPE FITTING MACHINE

Filed April 6, 1966

INVENTOR.
WALTER E. TREVATHAN
BY John R. Walker, III
Attorney

Jan. 7, 1969  W. E. TREVATHAN  3,420,124
PIPE FITTING MACHINE
Filed April 6, 1966  Sheet 5 of 6

INVENTOR.
WALTER E. TREVATHAN
BY John R. Walker, III
   attorney

INVENTOR.
WALTER E. TREVATHAN

United States Patent Office 3,420,124
Patented Jan. 7, 1969

3,420,124
PIPE FITTING MACHINE
Walter E. Trevathan, McKenzie, Tenn., assignor to Walter Trevathan Corporation, a corporation of Tennessee
Continuation-in-part of application Ser. No. 481,456, Aug. 23, 1965. This application Apr. 6, 1966, Ser. No. 552,680
U.S. Cl. 77—5          23 Claims
Int. Cl. B23b 41/00

ABSTRACT OF THE DISCLOSURE

A pipe-fitting machine for cutting a length of pipe to fit another length of pipe. The machine includes holding means mounted on a base for supporting and holding the pipe to be cut. A cutting head including a hollow cylindrical body portion having cutting teeth at one end thereof is movably supported for axial movement of the cutting head between retracted positions away from the pipe to be cut and towards cutting position relative to the pipe. There are means provided responsive to the axial movement of the cutting head to give a yieldable resistance to the movement of the cutting head towards the cutting positions to prevent the teeth from digging in too quickly into the pipe and for simultaneously supplying a lubricating fluid to the cutting teeth.

---

This is a continuation-in-part of my application Ser. No. 481,456, filed Aug. 23, 1965, now abandoned. This invention relates ot a machine for cutting pipe or the like to fit another pipe or the like, as when joining the end of one piece pipe with the cylindrical outside surface of another piece of pipe by welding.

Heretofore, the job of cutting one length of pipe so that the end thereof could be joined with another length of pipe was a difficult and usually a time-consuming procedure. In general, one of the following procedures was heretofore followed: (1) Cutting with a torch; (2) grinding (3) handfiling; (4) milling with a milling machine; or (5) punching with a punch press. The difficulties encountered in making a cut in one pipe that will fit properly the other pipe can readily be appreciated when it is considered that the cut must follow a complex curve which cannot be easily followed by known machines.

The present invention is directed towards overcoming the above-mentioned and other difficulties encountered in cutting pipe or the like to fit the cylindrical outside surface of another piece of pipe or the like.

Thus, one of the objects of the present invention is to provide a machine for quickly and easily cutting pipe or the like to fit another pipe or the like.

A further object is to provide such a machine which does a better job than previous means for cutting pipe or the like.

A further object is to provide such a machine in which the pipe can be cut at an angle.

A further object is to provide means in such a machine for restricting the speed of the feed of the cutting head to prevent the teeth thereof from digging in and biting too fast, which otherwise would cause the breaking thereof.

A further object is to provide such means which performs the additional function of feeding the lubricating fluid to the teeth of the cutting head at all times during the operation of the device.

A further object is to provide such means for feeding the lubricating fluid which operates automatically upon manual movement of the cutting head toward cutting positions and does not require a motor-driven pump.

A further object is to provide means in a pipe-cutting machine for holding the pipe to be cut at a selected position, either centered relative to the cutting head or offset to one side or the other.

A further object is to provide a machine for use in preparation for transversely joining a first length of round pipe to a second length of round pipe.

A further object is to provide a machine operative to form a semi-cylindrical kerf-cut transversely in the first length of pipe, to sever the kerf-cut portion from the pipe, and to form substantially a semi-cylindrical concave surface on said first pipe corresponding substantially in size and arc to the size and arc of the outer cylindrical surface of the second pipe.

A further object is to provide cylindrical saw means for forming a semi-cylindrical kerf-cut in a length of pipe.

A further object is to provide bracing means for bracing the cylindrical saw against radial deflection as a cut is being made and for facilitating an accurately cut pipe.

A further object is to provide bracing means for bracing the cylindrical saw against diametric elongation as a cut in being made and for facilitating an accurately cut pipe.

A further object is to provide such saw bracing means whereby a saw having a substantially thin cylindrical wall may be employed in forming a substantially narrow kerf in a pipe thereby facilitating rapid pipe-cutting with minimum power requirement and also facilitating accurate placing of the kerf-cut.

A further object is to provide a machine having selectively operable means for forming either a semi-cylindrical cut across the existing square-cut end portion of a length of pipe or having means for forming substantially a full circular transverse cut in the pipe intermediate the opposite ends of the pipe thereby severing the pipe and forming essentially two pipes each having a semi-cylindrically cut end portion or forming substantially a full circular transverse cut through a larger pipe.

The means by which the foregoing and other objects of the present invention are accomplished and the manner of their accomplishment will be readily understood from the following specification upon reference to the accompanying drawings, in which:

Referring now to drawings in which the various parts are indicated by numerals, the machine 11 of the present invention includes in general a stand or base 13, a holding device 15 mounted on base 13 for holding the pipe P to be cut, the cutting head assembly 17, the assembly 19 for supporting and for rotatably driving the cutting head assembly, and the assembly 21 which performs the dual functions of providing yieldable resistance to the movement of the cutting head towards cutting positions and for simultaneously supplying lubricating fluid to the cutting head.

Figures 1, 2, 3, 4, 5:
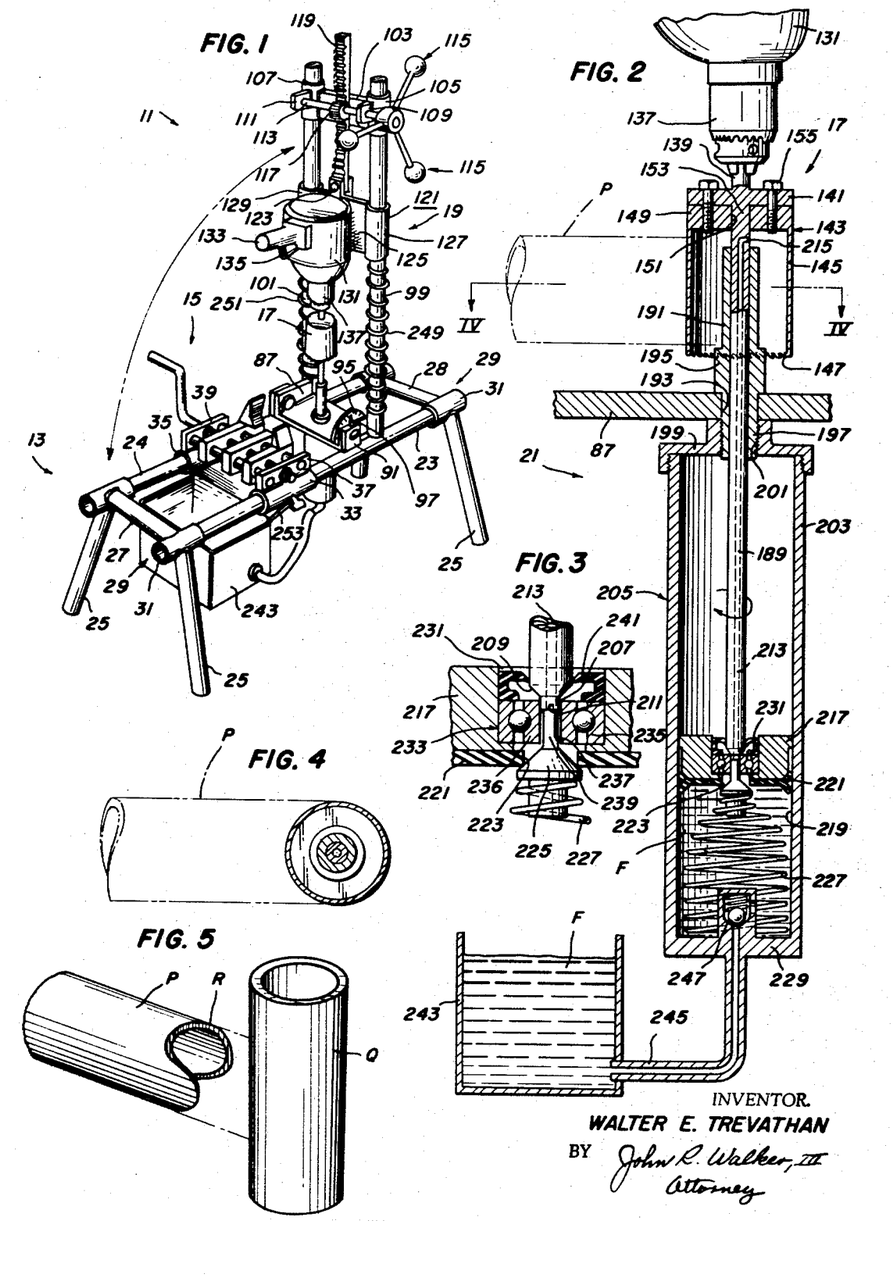
FIG. 1 is a perspective view of the machine of the present invention with parts removed for purposes of illustration.
FIG. 2 is an enlarged and somewhat schematic fragmentary sectional view through a portion of the machine of the present invention and taken as on a vertical plane, with the pipe that has been cut shown in broken lines.
FIG. 3 is a fragmentary enlarged view of a portion of the view shown in FIG. 2.
FIG. 4 is a sectional view taken as on the line IV—IV of FIG. 2.
FIG. 5 illustrates the type of joint between two pieces which is made possible by the present invention, with the pipes being shown just before joining.

Referring now in more detail to the above-mentioned general parts, and referring first to base 13, the base is preferably in the form best shown in FIG. 1 wherein it will be seen base 13 comprises a pair of laterally spaced and parallel rod-like horizontal members 23, 24 supported by legs 25 and having a pair of transverse rod-like members 27, 28 extending between the opposite ends of members 23, 24 to provide a rigid and open base 13. The corner joints of base 13 are preferably of the demountable type so that the base can be taken apart and the device mounted for use in conjunction with other equipment, as for example, a drill press, or so that the device can be positioned for making horizontal cuts. Thus, the joints 29 are preferably in the form of sleeves 31 fitted over the ends of members 23, 24 and held in place thereon as by set screws, not shown, with the transverse members 27, 28 and the legs 25 being fixedly joined to the sleeves 31 as by welding or the like.

The holding device 15 for the pipe P to be cut comprises a pair of sleeves 33, 35 respectively slidably mounted on members 23, 24 and respectively having plate members 37, 39 respectively fixedly attached to sleeves 33, 35 as by welding or the like and upstanding therefrom. Set screws, not shown, are preferably provided for holding sleeves 33, 35 in the desired position on members 23, 24. A pair of transversely extending parallel rods 41, 43 extend between plate members 37, 39 and rigidly join the plates together as by the ends of the rods extending through apertures in the plates and having nuts threadedly engaged on threaded portions at the ends of the rods. Jaws 45, each having a V-shaped notch 47 therein for engaging one side of pipe P, are fixedly mounted on a carrier member 49 which in turn is slidably mounted on rods 41, 43 by the rods respectively slidably extending through apertures 51, 53 in the carrier. In a similar manner jaws 55, each having V-shaped notch 57 for engaging the opposite side of pipe P from V-shaped notches 47, are fixedly mounted on a carrier 59, which in turn is slidably mounted on rods 41, 43 as by the rods extending through apertures 61, 63 in the carrier. A crank 65 having a shank 67 is provided for moving jaws 45, 55 towards and away from each other to clamp and unclamp the pipe. Shank 67, which is provided with threads 69 adjacent one end thereof and threads 71 adjacent the opposite end thereof, extends parallel and between rods 41, 43 with the shank extending through a hole 73 in plate member 39, through a threaded aperture in carrier 59, which threads 71 engage, through a threaded aperture in carrier 49 which threads 69 engage, and finally the end of the shank extends through a hole 75 in plate member 37. A positioning assembly 77 is provided in holding device 15 for transversely positioning the jaws 45, 55 relative to the cutting head assembly 17. Positioning assembly 77 comprises a plate member 79 slidably mounted on rods 41, 43 between the carriers 49, 59 and with the rods extending through apertures therein. Set screws 81 are provided in plate member 79 to engage the rods 41, 43 so that the plate member 79 can be secured in a desired position. A circular cut out portion 83 is provided adjacent the middle of plate member 79 and which cut out portion turnably receives an enlarged portion 85 provided on shank 67 between threads 69, 71 so that the crank 65 is permitted to turn yet is held against endwise movement of shank 67. Thus, it will be understood that when crank 65 is turned in one direction the jaws 45, 55 will move toward each other and when the crank is turned in the opposite direction, the jaws will move outwardly away from each other. Also, it will be understood that positioning of assembly 77 on rods 41, 43 in various positions will move the crank 65 and jaw carriers 49, 59 therewith as a unit so that the pipe can either be centered relative to the cutting head assembly 17 or can be offset to one side or the other relative to the cutting head assembly.

Assembly 19 preferably includes a substantially U-shaped bracket 87 which is pivotally mounted from base 13 for pivot about a substantially horizontal axis as by means of pins 89 extending through apertured lugs 91, 93 which in turn are fixedly mounted respectively on members 23, 24. Suitable means, not shown, is provided for locking bracket 87 in a selected angular position relative to base 13. Also, a scale 95 is attached to bracket 87 and a pointer 97 is attached to lug 91 so that the desired angle can be set. Also, if desired, in addition to degrees the scale can be calculated in terms of pitch. A pair of spaced apart and parallel cylindrical guide bars 99, 101 are fixedly attached adjacent the opposite sides of bracket 87. A transverse member 103 is mounted between guide bars 99, 101 adjacent the upper end thereof as by means of sleeves 105, 107 to which the opposite ends of the transverse member are rigidly attached and which in turn are fitted over the guide bars and fixedly held in place as by means of set screws or the like so that the position thereof can be adjusted. A pair of lugs 109, 111 are respectively fixedly attached to sleeves 105, 107 and extend outwardly therefrom. Lugs 109, 111 turnably receive through apertures therein a shaft 113 having a hand wheel 115 on the end thereof for turning the shaft. A pinion 117 is mounted on shaft 113 and engages a rack 119 which in turn is connected to an upper carrier 121 as by a pin 123. Upper carrier 121 comprises a plate 125 and a pair of sleeves 127, 129 fixedly attached to the opposite ends of plate 125 and slidably mounted respectively on guide bars 99, 101. Driving means, which in the example given is an electric motor 131 but which can be other well-known driving means, such as hydraulic motors, etc., is fixedly attached to plate 125. Motor 131 is of the usual drill type which includes a hand grip 133, a switch 135 to turn the motor off and on, and a chuck 137. Motor 131 is arranged so that the axis of chuck 137 is parallel to guide bars 99, 101 whereby when the hand wheel 115 is turned, the motor 131 will move in the direction of the axis of chuck 137 and parallel to guide bars 99, 101.

Cutting head assembly 17 includes a shank 139 extending axially of the cutting head and upwardly where it is received by the chuck 137. A flange 141 is provided on shank 139. The cutting head 143 per se includes a hollow cylindrical body portion 145 which is open ended at the bottom thereof and provided with a plurality of cutting teeth 147 around the lower circular edge thereof. The upper end of cutting head 143 is provided with a circular base 149 which is integrally formed at the upper end of cylindrical body portion 145. Base 149 is provided with a central aperture 151 which slidably fits over the portion 153 of shank 139 that extends below flange 141. Portion 153 is preferably square in cross section as well as central aperture 151 for rotation of cutting head 143 with shank 139. In addition, bolts 155 are threaded into aligned apertures in flange 141 and base 149 to hold the cutting head 143 in place. It should be noted that cutting head 143 is concentric with the axis of chuck 137.

Figure 6:
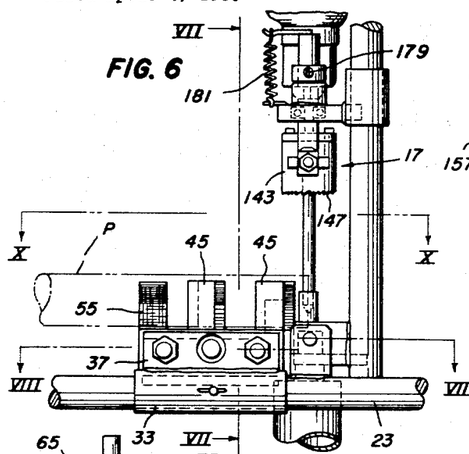
FIG. 6 is a fragmentary side elevational view of a portion of the machine of the present invention, with parts removed for purposes of illustration.
Figure 7:
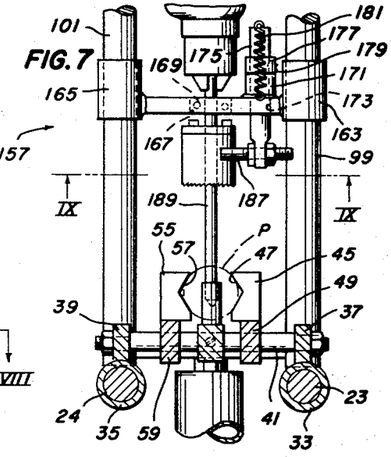
FIG. 7 is a fragmentary sectional view taken as on line VII—VII of FIG. 6.
Figure 8:
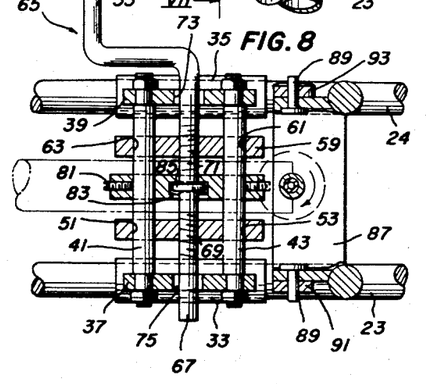
FIG. 8 is a fragmentary sectional view taken as on the line VIII—VIII of FIG. 6.
Figure 9:
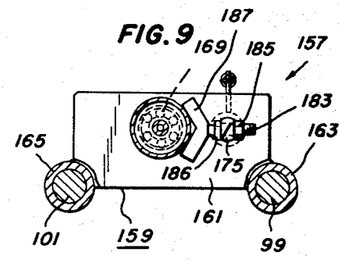
FIG. 9 is a sectional view taken as on the line IX—IX of FIG. 7.
Figure 10:
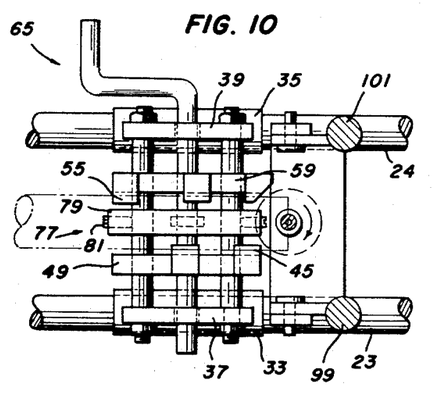
FIG. 10 is a fragmentary sectional view taken as on the line X—X of FIG. 6.

A bracing assembly 157 is preferably provided, as best seen in FIGS. 6, 7 and 9 although if desired, it may be omitted as in FIGS. 1 and 2. Bracing assembly 157 comprises a lower carrier 159 which includes a transverse member 161 fixedly mounted on sleeves 163, 165 which are respectively slidably mounted on guide bars 99, 101. A vertical opening 167 is provided in the center of transverse member 161 and suitable bearing means as a roller bearing 169 is mounted on transverse member 161 in opening 167 and engages shank 139 between chuck 137 and cutting head 143. A sleeve 171 is fixedly mounted on transverse member 161 on the upper side thereof in alignment with a vertical opening 173 through transverse member 161. A vertical rod 175 is slidably mounted in sleeve 171 and extends above the sleeve for a distance where a collar 177 is adjustably mounted thereon and provided with a set screw 179 so that downward movement of rod 175 can be adjusted to a desired limit which occurs when the collar 177 engages the upper end of sleeve 171. A spring 181 is mounted by suitable means adjacent the upper end thereof to the upper end of rod 175 and is mounted by suitable means adjacent the lower end thereof to transverse member 161 so that the spring urges rod 175 downwardly. At the lower end of rod 175 a threaded rod 183 is adjustably mounted and extends through a horizontally extending aperture in the lower end of rod 175 and is locked in place by means of locknuts 185, 186. At the end of rod 183 a substantially V-shaped backing member 187 is fixedly attached and slidably engages one side of cylindrical body portion 145. The backing member 187 is preferably adjusted so that when the cutting head 143 is away from the pipe P to be cut, the backing member is adjacent but spaced slightly above the cutting teeth 147. The purpose of backing member 187 is to hold the cutting head 143 in position against the lateral forces exerted thereon when the cutting head comes in contact with the pipe P. Thus, it will be understood that with the cutting head 143 rotating in a clock-wise position, as viewed from above when the teeth 147 contact the pipe, it will urge the cutting head 143 laterally towards backing member 187. Also, it will be understood that as the cutting of the pipe P progresses and as the cutting head 143 moves deeper into the pipe, the backing member 187 will engage the top of the pipe and will be urged upwardly against the force of spring 181. Thus, the backing member 187 can move as close to pipe P as possible during the entire cutting thereof and yet not interfere therewith.

The assembly 21 for providing yieldable resistance to axial downward movement of cutting head 143 and for providing lubricating fluid thereto comprises a plunger means or spindle 189 which is preferably integrally attached to portion 153 of shank 139 and forms an extension of shank 139. Spindle 189 thus extends downwardly and beyond cutting head 143 and slidably and turnably through a bushing 191 which in turn extends through a vertical opening 193 in bracket 87 and therebelow. Above bracket 87 bushing 191 is provided with an enlarged portion 195 and below the bracket is provided with a threaded portion 197. A substantially circular top 199 having a threaded central opening 201 is threadedly engaged on threaded portion 197 below bracket 87. Top 199 is joined to a hollow cylindrical body portion 203 as by threading the top on the body portion to establish an enclosed hollow cylinder 205. Spindle 189 extends downwardly into the interior of closed cylinder 205 and terminates at the distal end thereof in a reduced cylindrical end portion 207. Spindle 189 is tapered as at 209 between the reduced end portion 207 and the larger main body portion of the spindle. The lower end of end portion 207 is provided with a transverse notch 211 which serves as an entrance orifice for lubricating fluid F, which will be better understood in the description to follow later. A passageway 213 in spindle 189 communicates adjacent the lower end thereof with notch 211 and extends upwardly through the spindle and communicates with an exit orifice 215 provided in the side of spindle 189 interiorly of cutting head 143. A piston 217 is slidably mounted in cylinder 205 to provide a chamber 219 in the cylinder below the piston for receiving lubricating fluid F. A suitable sealing member 221 is mounted on the bottom of piston 217 for acting as a seal adjacent the outer peripheral edges thereof to prevent fluid flow around the outside of piston 217. Sealing member 221 is provided with a hole 223 adjacent the center thereof so that the portion of the sealing member defining hole 223 acts as a seat for a tapered valve 225. A spring 227 which extends between bottom 229 of cylinder 205 and valve 225, urges the valve into seating engagement with sealing member 221. A central opening 231 extends through piston 217 and is concentric with hole 223. A roller bearing 233 is mounted in central opening 231 above hole 223 with the outer race 235 thereof fixedly attached to piston 217 and with the inner race 236 being provided with a central hole 237 therethrough adapted to slidably receive end portion 207. Valve 225 is provided with a stem 239 integrally formed with valve adjacent the upper central part thereof and extending upwardly therefrom into central hole 237. A suitable gasket 241 is provided in opening 231 above roller bearing 233 and between spindle 189 and piston 217 to prevent leakage of fluid into the space in cylinder 205 above piston 217. End portion 207 is long enough so that when spindle 189 is moved downwardly the lower end of portion 207 will engage the upper end of stem 239 and will unseat valve 225 as shown in FIG. 2. It will be understood that the downward movement of spindle 189 relative to piston 217 will be limited by the engagement of tapered portion 209 against the top of inner race 236. Thereafter, continued downward movement of spindle 189 will cause the piston 217 to be urged downwardly and force the lubricating fluid F from chamber 219, through hole 223, alongside of stem 239 which is smaller in diameter than hole 237, through notch 211, through passageway 213 and out exit orifice 215 into the interior of cutting head 143 where the lubricating fluid will flow down onto the cutting teeth 147. Thus, it will be understood that as the cutting head 143 is moved downwardly by the operator turning hand wheel 115 to cause the cutting head to engage and cut the pipe P, the lubricating fluid F will automatically be supplied. In addition it will be understood that this restricted flow through the notch 211, passageway 213, and orifice 215 will cause a yieldable resistance to act against the downward movement of cutting head 143 so that the teeth 147 are prevented from digging in and biting too fast on the pipe P, which would otherwise cause the breaking of the cutting teeth. Also, it will be understood that during upward movement of spindle 189 the lower end thereof is operably disengageable from the piston 217 if the spindle is moved upwardly faster than spring 227 can move the piston 217 upwardly.

A tank 243 is preferably mounted on base 13 and contains a supply of the lubricating fluid F. A conduit 245 which communicates with the interior of tank 243 adjacent the bottom thereof, extends to cylinder 205 where it is in communication with chamber 219 through a suitable check valve 247 which prevents flow through conduit 245 from chamber 219 when piston 217 is being urged downwardly by spindle 189 but permits fluid to be drawn into chamber 219 by piston 217 when the piston is moved upwardly under the influence of spring 227. It will be understood that this upward movement of piston 217 is permitted when spindle 189 is withdrawn upwardly away from piston 217. Coil compression springs 249, 251 are preferably provided on guide bars 99, 101 to urge motor 131 and its related parts including spindle 189 upwardly away from piston 217 without the operator having to turn hand wheel 115. It will be understood that when the spindle 189 is first moved upwardly as above described and as shown in FIG. 3, the valve 225 will first close off to permit the drawing in of the lubricating fluid into chamber 219. Also, it will be understood that if additional shots of lubricating fluid are desired during the cutting operation, it is only necessary to back off or raise upwardly the motor 131 and then urge the motor quickly downwardly to cause the lubricating fluid to flow in additional quantities onto the cutting teeth 147. The lubricating fluid F is preferably drained back into tank 243 by suitable means as for example the drain pan 253, which is shown broken away in FIG. 1 but which preferably extends below the bracket 87 and to the tank.

In the example shown in the drawings, the machine 11 is set up to cut the pipe P at a right angle to be joined to the outside cylindrical surface of another pipe such as pipe Q shown in FIG. 5. The complex curve which has been cut by the cutting head 143 is shown at the end of the pipe P as at R. This end surface R of the pipe P will fit exactly and conform to the outside surface of pipe Q so that it forms an excellent joint that can be fixedly held together as by welding or the like. It will be understood that the outside diameter of cutting head 143 should be the same outside diameter as the pipe Q to which the pipe P is joined. Although a right angular joint is shown, it will be understood that by changing the angle of assembly 19 relative to base 13 so that the cutting head 143 is at other angles, any desired joint may be made in which the pipe P is joined to the pipe Q at any desired angle. It will also be noted that in the example the cut R is centered relative to the pipe P, but if desired, offset cuts may be made to one side or the other of the axis of the pipe as by adjusting the holding device 15 to one side or the other.

From the foregoing description it will be understood that the present invention provides a machine for quickly and easily cutting pipe or the like to fit another pipe or the like and at any desired angle. Also, it will be understood that a very unique feature is provided in the dual purpose means that is responsive to the movement of the cutting head and which offers resistance to the downward movement thereof and which simultaneously supplies lubricating fluid without the necessity of motor-driven pumps and the like.

Figure 11:
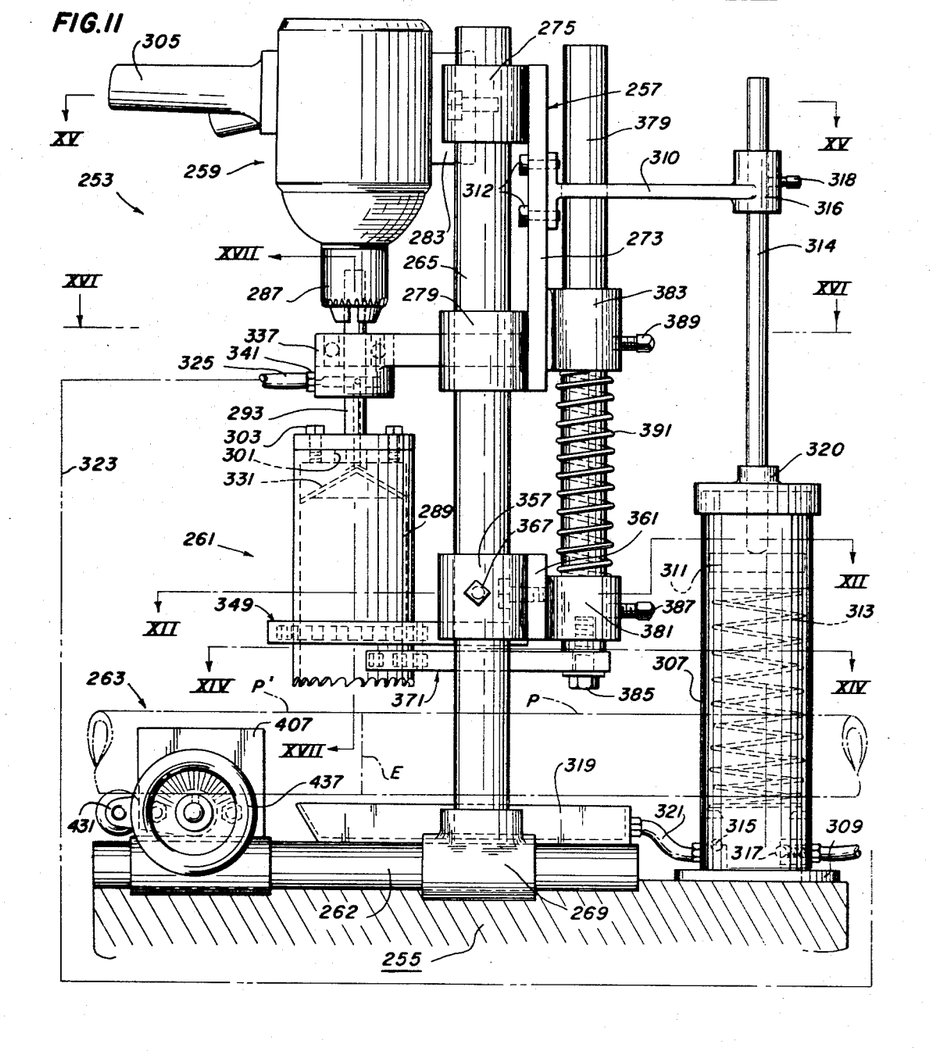
FIG. 11 is a side elevational view of a second embodiment of the present invention.

The second embodiment of the present invention is illustrated in FIGS. 11–20 and concerns chiefly those parts of the machine heretofore described other than the base or supporting structure. Such supporting structure of this second embodiment is illustrated in FIG. 11, and may be considered as being stationary structure. It will, of course, be understood that the base structure may be adjustably mounted and the upstanding support rods may be adjustable as heretofore described in the first embodiment. For purposes of clarity in description, however, the second embodiment is illustrated and will be described as being arranged for forming a semi-circular cut perpendicular to the axis of a pipe.

The second embodiment of the invention is illustrated by numeral 253 and includes base structure 255; a vertically reciprocatable carriage 257 supported from base structure 255; a drive means including a motor 259 mounted on carriage 257; a cutter head 261 supported and driven by the drive means; feed means for actuating and controlling the vertical movement of cutter head 261; pipe holding means 263 for rigidly holding a length of pipe; and bracing means for bracing cutter head 261 as a length of pipe is being cut.

Upstanding guide bars 265, 267 are fixedly secured by couplings 269, 271 to support rods 262, 264 and provide guide means for guiding carriage 257 in translational up and down movement. Carriage 257 includes a substantially square plate-like body 273; an upper pair of sleeves 275, 277; and a lower pair of sleeves 279, 281. Guide bar 265 extending through sleeves 275, 279 and guide bar 267 extending through sleeves 277, 281 co-actingly support the carriage for vertical movement. A vertically extending bracket 283 fixedly secured to carriage body 273 by bolts 285 securely mount motor 259 on carriage 257. Motor 259 includes rotatable drive structure including an adjustable chuck 287.

Cutter head 261 includes an upstanding cylindrical tubular body 289 having a multiplicity of cutting elements or teeth 291, and support structure rigidly interconnecting tubular body 289 with drive motor chuck 287. A vertical cylindrical shank member 293 is fixedly chucked at the upper end portion thereof in chuck assembly 287. An outwardly projecting annular flange portion 295 of the cutter head support structure is fixedly secured adjacent the lower end portion 297 of shank member 293. An annular inwardly projecting annular flange portion 299 having an aperture 301 is integrally formed with the upper portion of cutter head body 289. A plurality of threaded fasteners 303 extending respectively through apertures in flange 295 and threadedly engaging flange 299 firmly secure cutter head body 289 to cutter head shank member 293. The cutter head body support structure is such that the lower end portion 297 of shank member 293 extends through aperture 301 of cutter head body flange 299. The cutter head tubular body is held in coaxial rotative arrangement relative to the drive structure and chuck means of drive motor 259, and is adapted to be translationally movable along guide bar members 265, 267.

Bi-directionally operative reciprocative feed means provide means for up and down vertical movement of carriage 257 along guide bars 265, 267 and provide means for axial displacement of cutter head 261 into and out of cutting engagement with a length of pipe. A handle member 305 secured on motor 259 provides means for manually moving the carriage and cutter head up and down. The feed means includes dual purpose means simultaneously operative in response to downward axial displacement of the cutter head and motor, for controlling the rate of feed of the cutter head into the pipe material and, for dispensing lubricating fluid to the cutter head cutting elements 291 and to the pipe material being acted upon.

The dual purpose feed means preferably includes means for dispensing lubricating fluid into the hollow interior of cylindrical body 289 of cutter head 261. The means for controlling the downward axial displacement of cutter head 261 and for dispensing lubricating fluid preferably comprises the following: an upstanding tubular cylinder 307 is fixedly secured by a base flange 309 to base structure 255. A piston 311 is sealingly fitted in cylinder 307 and is urged upwardly by a coiled compression spring 313 compressed between the bottom of cylinder 307 and piston 311. An intake check valve 315 and an exhaust check valve 317 are fitted respectively in the bottom interior of cylinder 307 and are adapted to conduct lubricating fluid into and out of the cylinder upon vertical reciprocation of piston 311. An upwardly opening tank 319 is adapted to contain a quantity of lubricating fluid and a conduit 321 conducts fluid from tank 319 to intake valve 315. A second conduit 323, having an outlet end 325, conducts the lubricating fluid from cylinder 307 and exhaust valve 317 to cutter head 261. Linkage means is provided for transmitting vertical movement from carriage 257 to the cylinder piston assembly 307, 311.

The means for transmitting corresponding vertical movement from the carriage to the piston assembly preferably includes a rigid horizontal arm 310 rigidly secured by fasteners 312 to carriage body 273. A vertically extending plunger means or rod 314 vertically extends through an apertured cuff portion 316 of arm 310 and is adjustably secured by screw fastener 318. It will be seen by referring to FIG. 11 that the lower end of rod 314 rests on the upper surface of piston 311 and is disengageable therefrom if rod 314 is moved upwardly faster than spring 313 can move piston 311 upwardly. An apertured cap member 320 concentrically fitted on the upper end of tubular cylinder 307 provides vertical guide means for plunger rod 314. The cylinder piston assembly 307, 311 and associated parts provide substantially pump means for moving lubricating fluid through conduit 323 upon reciprocative movement of cutter head 261.

Although in certain applications of the present invention it may be desirable to secure outlet end 325 of conduit 323 in such a manner that the fluid issuing therefrom is directed on the outside of the cylindrical cutter head body, preferably the lubricating fluid is dispensed in the hollow interior of the cutter head. The structure for supplying the fluid in the interior of the cutter head preferably is as follows: Shank member 293 is provided with an axially extending passageway 325 having an entrance opening 327 and an exit opening 329. Entrance opening 327 is disposed intermediate the length of shank member 293 and opens laterally in the surface of the shank member. Exit opening 329 opens downwardly and is axially centered in lower end portion 297 of the shank member. A cone-shaped deflector member 331 having radially directed tab portions 333 is coaxially fitted in the upper interior of cutter head body 289. The apex portion 335 of deflector 331 is coaxially arranged with and vertically spaced directly underneath shank member lower end portion 297 and exit opening 329. The peripheral edge portions of deflector tab portions 333 frictionally engage the inside cylindrical surface of cutter head body 289 and firmly position the deflector in the cutter head body. A collar 337 having an annular void 339 is sealingly fitted around the upper portion of shank member 293 at entrance opening 327. A fitting 341 threadedly secured in collar 337 and connected to outlet end 325 of conduit 323 is adapted to conduct fluid into the annular interior 339 of collar 337. A sealing ring 343 concentrically arranged around shank member 293 sealingly interengages the shank member and collar.

A support arm 345 integrally secured to collar 337 and rigidly connected to carriage body 273 preferably supports shank member 293 and collar 337. A ball-bearing assembly 347 is fitted in the distal end portion of arm 345 and radially supports cutter head shank member 293.

Lubricating fluid passing through conduit 323, passes through annular void 339 in collar 337, downwardly through passageway 325 and upon the conical upper surface of deflector 331. Lubricating fluid issuing from shank member exit opening 329 engages apex portion 335 of the deflector and is radially deflected against the inside cylindrical surface of cutter head body 289. The centrifugal and gravitational forces acting on the lubricating fluid cause the fluid to run down along the inside cylinder surface of the cutter head body and on to the saw teeth and pipe material.

Bracing means engageable with the outside cylindrical surface of cutter head tubular body 289 is provided for bracing the body against horizontal radial deflection and against diametric elongation of the body, as a cut is being formed in a length of pipe. First and second bracing means are provided and are selectively operable in forming either a semi-cylindrical cut across the existing square-cut end portion of a length of pipe, or in forming substantially a circular transverse cut intermediate the ends of a length of pipe. It should be pointed out that when the term "semicylindrical" is used herein, it should be taken in its broadest sense to mean a part of a cylinder rather than necessarily a half of a cylinder.

Figures 12, 13, 14:
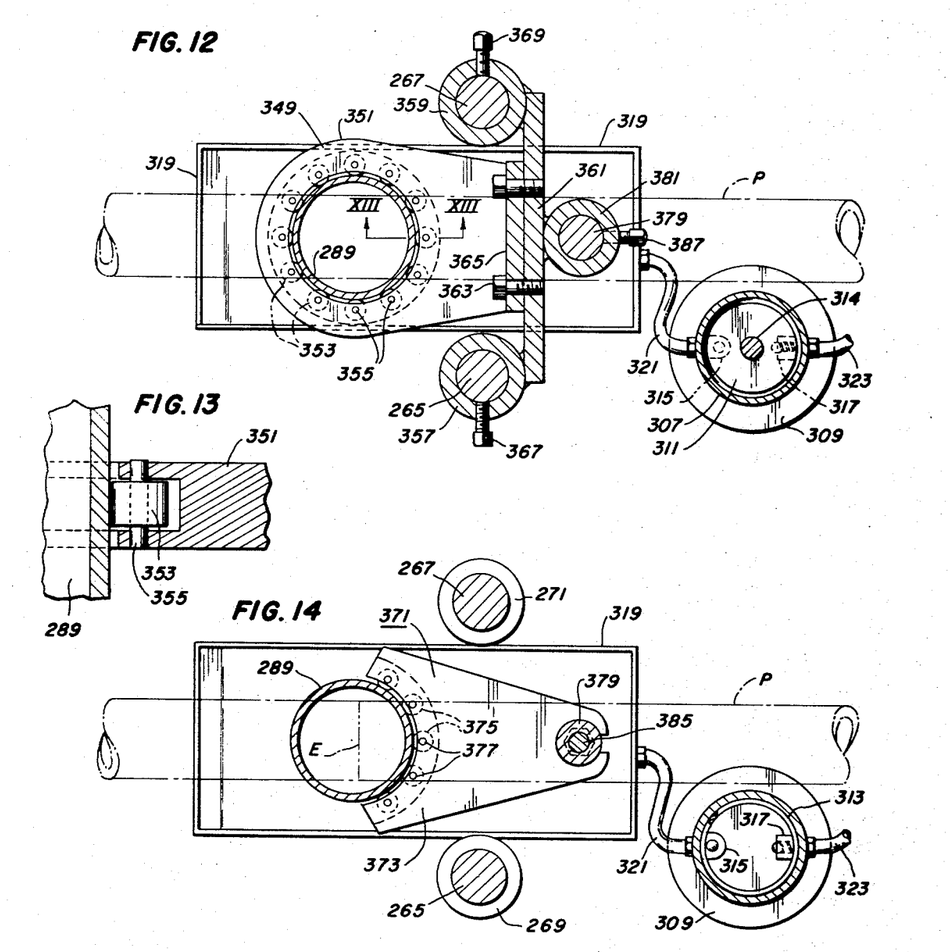
FIG. 12 is substantially a horizontal plane sectional view taken as on the line XII—XII of FIG. 11.
FIG. 13 is a vertical plane sectional view taken as on the line XIII—XIII of FIG. 12.
FIG. 14 is a horizontal plane sectional view taken as on the line XIV—XIV of FIG. 11.
Figure 15:
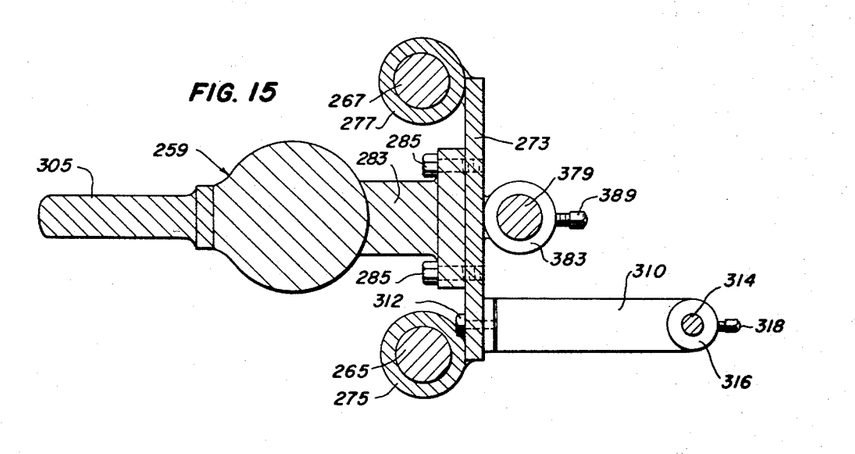
FIG. 15 is a horizontal plane sectional view taken as on the line XV—XV of FIG. 11.
Figures 16, 17, 18:
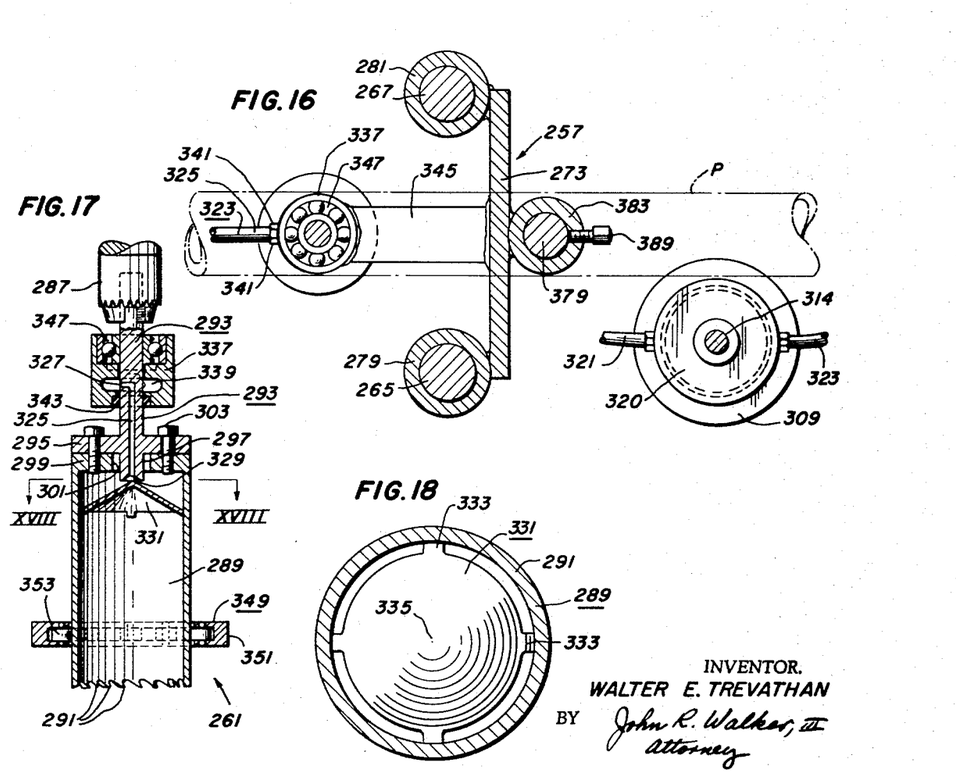
FIG. 16 is a horizontal plane sectional view taken as on the line XVI—XVI of FIG. 11.
FIG. 17 is a vertical plane sectional view taken as on the line XVII—XVII of FIG. 11.
FIG. 18 is a horizontal plane sectional view on an enlarged scale taken as on the line XVIII—XVIII of FIG. 17.
Figure 19:
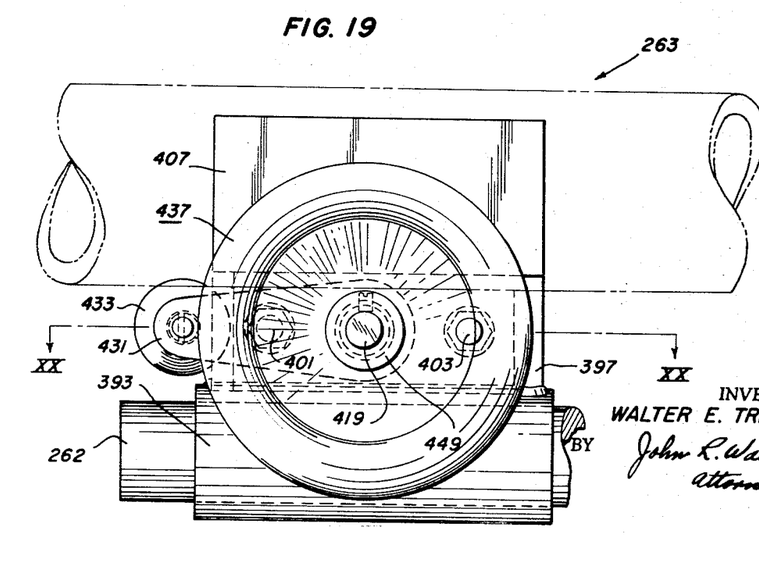
FIG. 19 is a side elevational view of the pipe-holding means of the second embodiment of the present invention.
Figure 20:
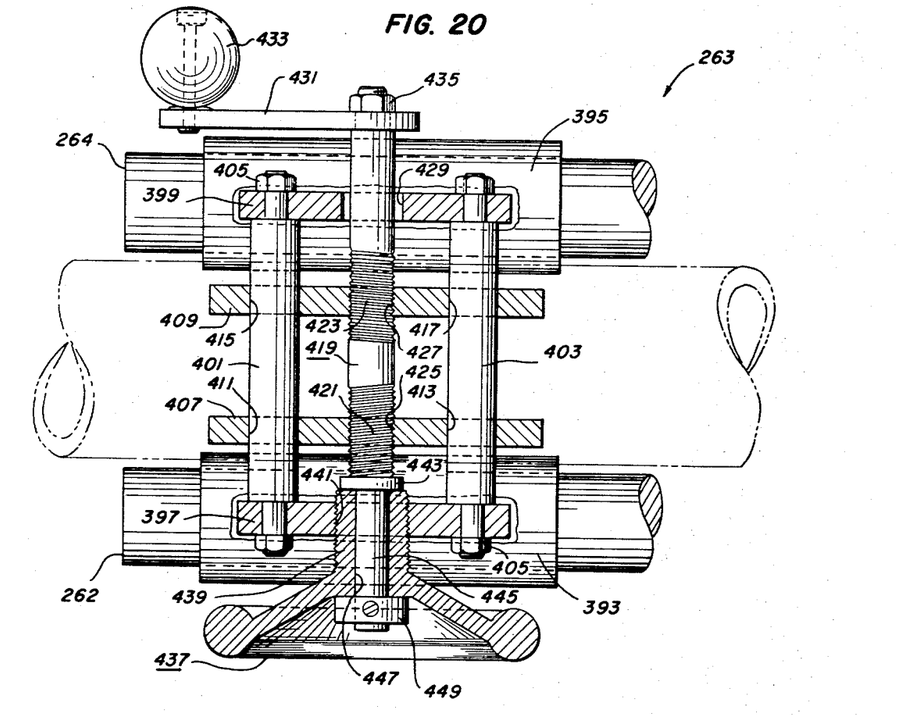
FIG. 20 is a horizontal plane sectional view taken as on the line XX—XX of FIG. 19.

First bracing means includes a vertically adjustable generally horizontal brace member 349 having frame structure 351 defining substantially a circular vertically opening through aperture (see FIG. 12). A plurality of cylindrical bearing members 353 are rotatably supported individual from frame structure 351. An axle pin 355 rotatably secures each bearing member 353 respectively in a radially directed annular recess extending around the circular opening of brace member frame structure 351 (see FIGS. 12 and 13). Brace member 349 extends horizontally and the frame structure portion thereof is adapted to be circumferentially disposed around the vertically arranged tubular body 289 of cutter head 261. The bearing surfaces respectively of plurality of bearing members 353 are adapted to uniformly engage the outer cylindrical surface of cutter head tubular body 289 and to firmly support the cutter head against radial or vertical deflection.

First brace member 349 is preferably adjustably supported from vertical guide bars 265, 267. Sleeve members 357, 359 are fixedly attached to the opposite ends of a horizontal cross member 361. Sleeve members 357, 359 are freely concentrically fitted respectively on vertical guide bars 265, 267 and provide means for vertical displacement of cross member 361 (see FIG. 12). Screw fasteners 363 extending through an upstanding flanged portion 365 of brace member 349 threadedly engage cross member 361 and fixedly connect the brace and cross members. Set screws 367, 369 threadedly fitted respectively in sleeves 357, 359 provide co-acting lock means for fixedly adjusting the vertical placement of first brace member 349. The first brace member is principally adapted to be employed in transversely cutting a length of pipe intermediate the length of the pipe.

The second bracing means of the present invention is principally adapted to be employed when the machine is used in forming a semi-cylindrical cut across an existing square-cut end portion of a length of pipe. In contrast to the above-described first bracing means, the second bracing means includes a brace member 371 adapted to correspondingly move vertically simultaneously with cutter head 261. Brace member 371 includes frame structure 373 defining a horizontally directed semi-circular recess (see FIG. 14). A plurality of semi-circularly arranged angularly spaced bearing members 375 are rotatably supported individually from brace member frame structure 373. Vertically extending axle pins 377 respectively support cylindrical bearing members 375 in a radially directed semi-annular recess in brace member frame structure 373. The cylindrical surfaces of bearing members 375 are adapted to uniformly engage the outside cylindrical surface of cutter head tubular body 289 and to support the tubular body against diametric elongation of the body as the pipe is being cut.

The means for supporting brace member 371 preferably includes the following: A cylindrical guide bar 379 is vertically supported in guide bushings 381, 383 fixedly attached respectively to cross member 361 and carriage body 373. Guide bushings 381, 383 are fixedly attached horizontally medially respectively to cross member 361 and carriage body plate 273, and in conjunction with guide bar 379 provide vertical placement support means for second brace member 371. A screw fastener 385 extending through a slotted aperture in the proximal end portion of brace member 371 securely connects guide bar 379 and brace member 371; screw fastener 385 is threadedly engaged in the lower end portion of guide bar 379 and fixedly connects the guide bar and brace member in mutually perpendicular relationship. Set screws 387, 389 threadedly engage respectively in bushings 381, 383 are adapted to abuttingly engage the cylindrical surface of guide bar 379 for adjusting the vertical placement of second brace member 371.

Second brace member 371 and the second bracing means is principally adapted to be used in making a semi-cylindrical cut across the square-cut end edge portion of a length of pipe, as a pipe P′ having a square-cut end edge surface E (see FIGS. 11 and 14). Set screw 389 and associated structure provides releasable lock means for manually selectively adjusting the vertical distance between carriage 257 and second brace member 371 and provides means for fixedly adjusting the relative elevation of the cutter head body and the second brace member. Lower set screw 387 provides means mainly for fixedly securing second brace member 371 in an up and substantially inoperative disposition when the first and second brace means are used in conjunction. A compression spring 391 convolutely arranged around guide bar 379 and compressively interposed between guide bushings 381 and 383 provides counterbalance means for urging the cutter head upwardly.

Pipe holding means 263 is preferably mounted on horizontally extending support rod members 262, 264 of base structure 255. Sleeve members 393, 395 are concentrically fitted respectively on support rod members 262, 264. A pair of parallel spaced upstanding plate members 397, 399 are fixed fin-like to the upper cylindrical surfaces of sleeve members 393, 395. A parallel pair of cylindrical guide rods 401, 403 extend respectively transversely of support rods 262, 264 and fixedly bridge plate members 397, 399. The reduced end portions respectively of guide rods 401, 403 extend through aligned apertures in plate-members 397, 399. Nuts 405 threadedly engaged on the reduced end portions of rods 401, 403 fixedly secure the rods in parallel spaced relationship. It will be understood that, if desired, one of the ends of each of the rods 401, 403 may be unsecured in a direction lengthwise of the rods. For example, the nuts 405 at the ends of the rods adjacent plate member 399 may be removed so that the rods 401, 403 may move in a direction lengthwise of the rods whereby manufacturing variations may exist without effecting the operation of the machine. As for example, if support rods 262, 264 were not precisely parallel, the sleeve members 393, 395 could move thereon without binding since the sleeve members not being rigidly bound to each other could move towards and away from one another.

A co-acting parallel spaced pair of jaw members 407, 409 are supported individually from guide rods 401, 403. Apertures 411, 413 and 415, 417 are provided in the lower proximal portions respectively of jaw members 407, 409. The cylindrical aperture surface structure of jaw members 407, 409 slidably engage respectively guide rods 401, 403. A contra-directionally threaded shaft member 419 provides substantially the means for co-actingly moving jaw members 407, 409 together or apart. Axially spaced clockwise and counterclockwise threaded portions 421, 423 engage respectively threaded apertures 425, 427 of jaw members 407, 409. Shaft member 419 extends horizontally freely through an aperture 429 in support plate 399. A crank member 431 having a knob-like handle 433 is perpendicularly attached to the end potrion of shaft 419 by a nut fastener 435. Crank member 431 provides manually operative lever means for bi-directional rotational movement of shaft 419, and for opening and closing jaw members 407, 409.

In addition to the above-described pipe clamping means, pipe holding mechanism 263 includes pipe positioning means for selectively horizontally displacing a clamped pipe transversely relative to cutter head 261. A dished wheel 437 including a threaded hub or spool portion 439 is threadedly engaged in threaded aperture 441 in plate member 397. That end of shaft member 419 remote from crank member 431 is provided with an annular shoulder 443 and an axially projecting reduced cylindrical portion 445. The reduced portion of shaft 419 projects through and is freely rotatable in the cylindrical aperture 447 of spool portion 439 of wheel 437. A collar 449 axially secures wheel 437 on shaft 419.

Wheel 437 provides manually operable leverage means for turning spool portion 439 and for causing axial displacement of shaft 419 and selective corresponding translational displacement of pipe clamping jaw members 407, 409. It will be appreciated that spool portion 439 of wheel 437 provides spool means for axial actuation of shaft member 419; and that the spool means can be other than integrally formed with the wheel means; and that the manually operable leverage means for turning the spool means can be other than a wheel without departing from the spirit and scope of the invention.

In operation of machine 253, and when it is desired to form a transverse cut intermediate the ends of a length of pipe, the following procedure may be carried out:

The machine is arranged substantially as illustrated in FIG. 11 with the carriage and cutter head in a raised disposition. The brace member set screws 367, 369 of the first bracing means and set screws 387 of the second bracing means are abuttingly engaged against the respective guide bars and secure first and second brace members 349, 371 respectively at a fixed elevation and in relatively fixed relationship; the operator, by grasping handle 305, may then move the carriage and cutter head downwardly thus severing pipe P and forming substantially two semi-cylindrically end-cut pipes or forming a full circular transverse cut through a larger pipe.

When it is desired to form a semi-cylindrical cut across an existing square-cut end edge E of a pipe, as length of pipe P', the following procedure may be carried out: The first and second brace members 349, 371 are arranged substantially as illustrated in FIG. 11; set screws 367, 369 are abuttingly engaged respectively with guide bars 265, 267, thereby fixing brace member 349 at a fixed elevation; set screw 387 is disengaged from guide bar 379 and set screw 389 is turned inwardly and engaged with guide bar 379; the operator may then move the cutter head downwardly by handle 305 and sever a semi-cylindrical kerf-cut portion from the end of pipe P'.

The operation of the feed control and lubricating fluid means functions in the following manner: When cutter head 261 is moved upwardly, plunger rod 314 and piston 311 are moved upwardly by compression spring 313. The upward movement of piston 311 unseats intake check valve 315 and lubricating fluid is drawn from tank 319 through conduit 321 and into cylinder 307. When the cutter head is moved downwardly and a cut is being formed in a pipe, piston 311 is moved downwardly and fluid in cylinder 307 is expelled through exhaust check valve 317, through conduit 323, through collar 337 and shank passageway 325, and is dispersed in the interior of cutter head body 289 by deflector 331.

In certain applications of the machine, it may be desirable to regulate the rate of feed of cutter head 261 and to regulate the amount of lubricating fluid dispensed on the cutting head and work material. The size of conduits 321, 323 and the other passageway means in the pump means of the machine determine substantially the speed of downward axial displacement of the cutter head. It may be desirable in certain instances to control the cutter head feed and the fluid dispensing means. This may be accomplished by having sufficiently large passageway means for the lubricating fluid and providing valve means in the conduit means for adjustably restricting the passage of fluid and for metering the amount of fluid dispensed.

Although the present invention has been described in some detail by way of illustration and example for purposes of clarity or understanding, it is to be understood that it is not to be so limited since changes and modifications may be made therein which are within the full intended scope of this invention as hereinafter claimed.

I claim:

1. A pipe fitting machine for cutting a length of pipe or the like to fit another length of pipe, said machine comprising a base, holding means mounted on said base for supporting and holding the pipe to be cut, a cutting head including a hollow exposed cylindrical body portion having cutting teeth at one end thereof, support means supporting said cutting head for axial movement of said cutting head between retracted positions away from the pipe to be cut towards cutting positions relative to the pipe to be cut, means responsive to axial movement of said cutting head including means connected to said cutting head and communicated with the interior thereof for supplying lubricating fluid under pressure to the inside of said cutting head for flow onto said cutting teeth, and means for rotatably driving said cutting head about the axis of said cylindrical body portion.

2. A pipe-fitting machine for cutting a length of pipe or the like to fit another length of pipe, said machine comprising a base, holding means mounted on said base for supporting and holding the pipe to be cut, a cutting head including a hollow exposed cylindrical body portion having cutting teeth at one end thereof, support means supporting said cutting head for axial movement of said cutting head between retracted positions away from the pipe to be cut and towards cutting positions relative to the pipe to be cut, means responsive to axial movement of said cutting head for providing yieldable resistance and including means attached to said cutting head and communicated with the interior thereof for conducting the lubricating fluid under pressure to the inside of said cutting head for flow onto the movement of said cutting head toward said cutting positions and for simultaneously supplying lubricating fluid to said cutting teeth, and means for rotatably driving said cutting head about the axis of said cylindrical body portion.

3. The machine of claim 2 in which means is provided for changing the angle of said support means relative to said base to selectively vary the angle of said cutting head relative to the length of pipe being cut.

4. The machine of claim 2 in which said holding means comprises a pair of jaw means for engaging opposite sides of the pipe to be cut, and means supporting said pair of jaw means for selectively positioning said pair of jaw means together in the same direction transversely relative to said cutting head.

5. The machine of claim 2 in which said means responsive to axial movement of said cutting head comprises a hollow cylinder, a piston slidably mounted in said cylinder, means for supplying fluid to said cylinder below said piston, means coupled to said cutting head for engaging said piston for moving said piston downwardly against said fluid, and means leading from said cylinder to said cutting head for conducting the fluid to said cutting head when said piston is forced downwardly against the fluid.

6. A machine for cutting a first length of metal pipe or the like to fit a second length of metal pipe or the like comprising, in combination, a base structure; pipe holding means supported from said base structure for rigidly supporting and holding a pipe in a horizontal disposition; a carriage; guide means rigidly secured to said base structure for guiding said carriage in translational vertical movement; rotary drive means including rotatable drive structure supported and fixedly journaled from said carriage, said drive means including power means for rotating said drive structure; a cutter head including a cylindrical vertically arranged exposed tubular body rigidly secured to and in co-axial rotative arrangement with the drive structure of said drive means, said cutter head including a multiplicity of annularly arranged cutting elements substantially integrally secured to the lower end edge of said cylindrical tubular body and operative in a plane perpendicular to the axis of said tubular body; bi-directional, translationally reciprocative feed means operatively connected to said carriage for up-and-down vertical movement of said carriage and for axial displacement of said cutter head into and out of cutting engagement with said first pipe; hydraulic means, including restriction means, responsive to axial movement of said cutting head for providing flow of hydraulic fluid through said restriction means and yieldable resistance to the movement of said cutting head towards said cutting engagement with said first pipe to prevent excessive digging in of said teeth into said first pipe; and bracing means operatively engageable with the outer cylindrical surface of said cutter head tubular body for bracing said body against horizontal radial deflection and diametric elongation of said body; said machine being operatively adapted to form a semi-cylindrical kerf-cut transversely in said first pipe, to sever the kerf-cut portion from said pipe, and to form substantially a semi-cylindrical concave surface on said first pipe corresponding substantially in size and arc to the size and arc of the outer cylindrical surface of said second pipe; the concave kerf-cut surface of said first pipe being adapted to be match-joined to the convex cylindrical outer wall surface of said second pipe.

7. A machine as defined in claim 6 further characterized in that said bi-directional translationally reciprocative feed means includes means operative in response to downward axial displacement of said cutter head, for dispensing lubricating fluid to the cutting elements of the cutting head and to the pipe material being acted upon simultaneously with the providing of said yieldable resistance to provide simultaneous operative dual means.

8. A machine as defined in claim 7 further characterized in that said simultaneously operative dual means includes reciprocatively operative pump means including a source of fluid, conduit means for conducting the fluid from said pump means to said cutter head, linkage means for transmitting movement from said cutter head to said pump means and for expelling fluid from said pump means and through said conduit means upon downward displacement of said cutter head, and means included in said conduit means for restricting the passage of fluid and for metering the amount of fluid dispensed.

9. A machine as defined in claim 6 in which said pipe-holding means includes pipe clamping means including guideway means supported essentially from said base structure, first and second jaw members supported individually from said guideway means and adapted for movement toward and away from each other and for clamping the opposite side surfaces of a length of pipe, a shaft member including axially spaced first and second cylindrical portions, co-actingly operative clockwise thread means interengaging said first cylindrical portion and said first jaw member, co-actingly operative counter-clockwise thread means interengaging said second cylindrical portion and said second jaw member, manually operative lever means secured to said shaft member for bi-directional rotational movement of said shaft member and for opening and closing said jaw members; and manually operative pipe positioning means for selectively horizontally translationally displacing said pipe clamping means as a unit and for positioning a clamped pipe transversely relative to said vertical cutter head.

10. A machine for use in transversely joining a first length of round pipe to a second length of round pipe comprising, in combination, a base structure; pipe holding means supported from said base structure for rigidly holding a pipe in a horizontal disposition; a carriage; guide means rigidly secured to said base structure for guiding said carriage in translational vertical movement; rotary drive means including rotatable drive structure supported and fixedly journaled from said carriage, said drive means including power means for rotating said drive structure; a cutter head including a cylindrical vertically arranged tubular body rigidly secured to and in co-axial rotative arrangement with the drive structure of said drive means, said cutter head including a multiplicity of annularly arranged cutting elements integrally secured to the lower end edge of said cylindrical tubular body and operative substantially in a plane perpendicular to the axis of said tubular body; bi-directional translationally reciprocative feed means operatively connected to said carriage for up and down vertical movement of said carriage and for axial displacement of said cutter head into and out of cutting engagement with said first pipe; first bracing means including a vertically adjustable fixedly securable generally horizontal first brace member supported essentially from said base structure, said brace member including frame structure defining a substantially circular vertically opening through aperture, and a plurality of circularly arranged angularly spaced bearing members rotatably supported individually from said brace member frame structure and disposed around the inward side of said circular aperture, said brace member frame structure being disposed circumferentially around the vertically arranged tubular body of said cutter head with the bearing surfaces respectively of said plurality of bearing members engaging the outer cylindrical surface of said tubular body; and second bracing means including a generally horizontal second brace member including frame structure defining substantially a horizontally directed semi-circular recess, a plurality of semi-circularly arranged angularly spaced bearing members arranged uniformly adjacent said recess and rotatably supported individually from said frame structure, guide means essentially supported from said base structure for vertically guiding said second brace member in a rectilinear path parallel to the path of said cutter head and with said plurality of bearing members rotatably engaging the outer cylindrical surface of said cutter head body, said guide means including vertically extending coupling means adjustably interconnecting said carriage and said second brace member for simultaneous corresponding movement of said carriage and said second brace member, said guide means including releasable lock means for manually selectively adjusting the vertical distance between said carriage and said second brace member and for fixedly adjusting the relative elevation of said cutter head body and said second brace member.

11. A pipe-fitting machine for cutting a length of pipe to fit another length of pipe, said machine comprising a base, holding means mounted on said base for supporting and holding the pipe to be cut, a cutting head including a hollow cylindrical body portion having cutting teeth at one end thereof, support means supporting said cutting head for axial movement of said cutting head between retracted positions away from the pipe to be cut and towards cutting positions relative to the pipe to be cut, means for rotatably driving said cutting head about the axis of said cylindrical body portion, cylinder means, a piston slidably mounted in said cylinder means, fluid supply means communicated with said cylinder means, resilient means urging said piston upwardly to draw fluid from said supply means into said cylinder means, conduit means interconnected between said cylinder means and the interior of said cutting head, valve means in said conduit means for valving the flow of liquid therethrough, means responsive to axial movement of said cutting head and including plunger means movable downwardly with downward movement of said cutting head to push said piston downwardly against the force of said resilient means and express liquid from said cylinder means into the interior of said cutting head through said conduit means, and restriction means in said conduit means for restricting the flow of liquid therethrough and thereby restricting the downward movement of said cutting head to prevent excessive digging in of the teeth into the pipe being cut.

12. The pipe-fitting machine of claim 11 in which said plunger means is operably disengageable from said piston upon upward movement of said plunger means to permit independent operation of said plunger by said resilient means to draw liquid into said cylinder means.

13. The pipe-fitting machine of claim 11 in which said valve means is normally closed and is actuated to an open position by engagement of said plunger means therewith during the downward movement of said plunger means.

14. The pipe-fitting machine of claim 11 in which said cylinder means is positioned below said cutting head and in which said plunger means is attached to said cutting head and extends downwardly therefrom in concentric relationship therewith and into said cylinder means.

15. The pipe-fitting machine of claim 11 in which said conduit means includes a passageway through said means and said restriction means is in said passageway.

16. The pipe-fitting machine of claim 11 in which said resilient means in addition to urging said piston upwardly urges said valve means towards a normally closed disposition.

17. A pipe-fitting machine for cutting a length of pipe or the like to fit another length of pipe, said machine comprising a base, holding means mounted on said base for holding the pipe to be cut, a cutting head including a hollow cylindrical body portion having cutting teeth at one end thereof, support means supporting said cutting head for axial movement of said cutting head between retracted positions away from the pipe to be cut and towards cutting positions relative to the pipe to be cut, means responsive to axial movement of said cutting head for providing yieldable resistance to the movement of said cutting head toward said cutting positions and for simultaneously supplying lubricating fluid to said cutting teeth, and means for rotatably driving said cutting head about the axis of said cylindrical body portion, said holding means comprising rod means adjustably mounted on said base for movement toward and away from said cutting head, crank means including a shank extending substantially parallel to said rod means, said shank having a first threaded portion and an oppositely threaded second portion, positioning means turnably supporting said crank means on said rod means, a pair of jaw means respectively slidably mounted on said rod means for movement towards and away from one another and respectively having threaded apertures engaged respectively with said first and second threaded portions of said shank for movement of said pair of jaw means away from one another upon rotation of said crank in one direction and for movement of said pair of jaw means towards one another upon rotation of said crank in the opposite direction, said positioning means being slidably mounted on said rod means and including locking means for selectively positioning said pair of jaw means transversely relative to said cutting head and for locking said positioning means in a selected place.

18. A pipe-fitting machine for cutting a length of pipe or the like to fit another length of pipe, said machine comprising a base, holding means mounted on said base for holding the pipe to be cut, a cutting head including a hollow cylindrical body portion having cutting teeth at one end thereof, support means supporting said cutting head for axial movement of said cutting head between retracted positions away from the pipe to be cut and towards cutting positions relative to the pipe to be cut, means responsive to axial movement of said cutting head for providing yieldable resistance to the movement of said cutting head toward said cutting positions and for simultaneously supplying lubricating fluid to said cutting teeth and means for rotatably driving said cutting head about the axis of said cylindrical body portion, said means responsive to axial movement of said cutting head comprising a spindle coupled to said cutting head interiorly thereof and extending axially thereof beyond said cutting teeth to its termination in a distal end; said spindle having an entrance orifice adjacent the distal end thereof, having an exit orifice adjacent said cutting head and having a passageway extending between said entrance and exit orifices; a hollow enclosed cylinder having means adjacent one end thereof slidably receiving said spindle with said spindle extending into the interior of said hollow cylinder, a piston slidably mounted in said hollow cylinder to provide a chamber in said cylinder for receiving lubricating fluid, lubricating fluid supply means coupled into said chamber, resilient means urging said piston in a first direction for drawing lubricating fluid into said chamber when said piston is permitted to move in said first direction, valve means engageable by and operable responsive to movement of said spindle thereagainst in response to movement of said cutting head towards cutting positions for permitting flow into said passageway and at the same time said piston being engageable by said spindle to move said piston in the opposite direction from said first direction to cause said lubricating fluid to move under pressure through said passageway and out said exit orifice.

19. A pipe-fitting machine for cutting a length of pipe or the like to fit another length of pipe, said machine comprising a base, holding means mounted on said base for holding the pipe to be cut, a cutting head including a hollow cylindrical body portion having cutting teeth at one end thereof, support means supporting said cutting head for axial movement of said cutting head between retracted positions away from the pipe to be cut and towards cutting positions relative to the pipe to be cut, means responsive to axial movement of said cutting head for providing yieldable resistance to the movement of said cutting head toward said cutting positions and for simultaneously supplying lubricating fluid to said cutting teeth and means for rotatably driving said cutting head about the axis of said cylindrical body portion, said means responsive to axial movement of said cutting head comprising a spindle coupled to said cutting head interiorly thereof and extending axially thereof beyond said cutting teeth to its termination in a distal end; said spindle having an entrance orifice adjacent the distal end thereof, having an exit orifice adjacent said cutting head and having a passageway extending between said entrance and exit orifices; a hollow enclosed cylinder having means adjacent one end thereof slidably receiving said spindle with said spindle extending into the interior of said hollow cylinder, a piston slidably mounted in said hollow cylinder to provide a chamber in said cylinder for receiving lubricating fluid, lubricating fluid supply means coupled into said chamber, resilient means urging said piston in a first direction for drawing lubricating fluid into said chamber when said piston is permitted to move in said first direction, valve means engageable by and operable responsive to movement of said spindle thereagainst in response to movement of said cutting head towards cutting positions for permitting flow into said passageway and at the same time said piston being engageable by said spindle to move said piston in the opposite direction from said first direction to cause said lubricating fluid to move under pressure through said passageway and out said exit orifice, said orifice and said passageway being restricted to cause restricted flow of said lubricating fluid therethrough for providing a yieldable resistance to movement of said cutting head in said opposite direction.

20. A machine for cutting a first length of pipe or the like to fit a second length of pipe or the like comprising, in combination, a base structure; pipe holding means supported from said base structure for rigidly holding a pipe in a horizontal disposition; a carriage; guide means rigidly secured to said base structure for guiding said carriage in translational vertical movement; rotary drive means including rotatable drive structure supported and fixedly journaled from said carriage, said drive means including power means for rotating said drive structure; a cutter head including a cylindrical vertically arranged tubular body rigidly secured to and in co-axial rotative arrangement with the drive structure of said drive means, said cutter head including a multiplicity of annularly arranged cutting elements substantially integrally secured to the lower end edge of said cylindrical tubular body and operative in a plane perpendicular to the axis of said tubular body; bi-directional, translationally reciprocative feed means operatively connected to said carriage for up-and-down vertical movement of said carriage and for axial displacement of said cutter head into and out of cutting engagement with said first pipe; and bracing means operatively engageable with the outer cylindrical surface of said cutter head tubular body for bracing said body against horizontal radial deflection and diametric elongation of said body; said machine being operatively adapted to form a semi-cylindrical kerf-cut transversely in said first pipe, to sever the kerf-cut portion from said pipe, and to form substantially a semi-cylindrical concave surface on said first pipe corresponding substantially in size and arc to the size and arc of the outer cylindrical surface of said second pipe; the concave kerf-cut surface of said first pipe being adapted to be match-joined to the convex cylindrical outer wall surface of said second pipe, said bi-directional translationally reciprocative feed means including dual means simultaneously operative in response to downward axial displacement of said cutter head for controlling the rate of feed of said cutter head into the pipe material and for dispensing lubricating fluid to the cutting elements of the cutting head and to the pipe material being acted upon, said cutter head including a concentrically arranged elongated shank member rigidly interconnecting said rotatable drive structure and said cutter head body, and further that said means for dispensing the lubricating fluid into the hollow interior of said cutter head includes structure defining a longitudinal passageway in said shank member having an entrance opening in the lateral surface of said shank means and an exit opening arranged concentrically in the upper portion of said cutter head body, a cone-shaped deflector co-axially fitted in said body with the apex of said cone-shaped deflector being directly underneath said exit opening, concentric sealing means including a hollow collar sealingly fitted around said cutter head shank member and with said entrance opening of said passageway communicating with the hollow interior of said collar, and conduit means for conducting fluid from said pump means to the hollow interior of said collar.

21. A machine for cutting a first length of pipe or the like to fit a second length of pipe or the like comprising, in combination, a base structure; pipe holding means supported from said base structure for rigidly holding a pipe in a horizontal disposition; a carriage; guide means rigidly secured to said base structure for guiding said carriage in translational vertical movement; rotary drive means including rotatable drive structure supported and fixedly journaled from said carriage, said drive means including power means for rotating said drive structure; a cutter head including a cylindrical vertically arranged tubular body rigidly secured to and in co-axial rotative arrangement with the drive structure of said drive means, said cutter head including a multiplicity of annularly arranged cutting elements substantially integrally secured to the lower end edge of said cylindrical tubular body and operative in a plane perpendicular to the axis of said tubular body; bi-directional, translationally reciprocative feed means operatively connected to said carriage for up-and-down vertical movement of said carriage and for axial displacement of said cutter head into and out of cutting engagement with said first pipe; and bracing means operatively engageable with the outer cylindrical surface of said cutter head tubular body for bracing said body against horizontal radial deflection and diametric elongation of said body; said machine being operatively adapted to form a semi-cylindrical kerf-cut transversely in said first pipe, to sever the kerf-cut portion from said pipe, and to form substantially a semi-cylindrical concave surface on said first pipe corresponding substantially in size and arc to the size and arc of the outer cylindrical surface of said second pipe; the concave kerf-cut surface of said first pipe being adapted to be match-joined to the convex cylindrical outer wall surface of said second pipe, said pipe-holding means including pipe clamping means including guideway means supported essentially from said base structure, first and second jaw members supported individually from said guideway means and adapted for movement toward and away from each other and for clamping the opposite side surfaces of a length of pipe, a shaft member including axially spaced first and second cylindrical portions, co-actingly operative clockwise thread means interengaging said first cylindrical portion and said first jaw member, co-actingly operative counterclockwise thread means interengaging said second cylindrical portion and said second jaw member, manually operative lever means secured to said shaft member for bi-directional rotational movement of said shaft member and for opening and closing said jaw members; and manually operative pipe positioning means for selectively horizontally translationally displacing said pipe clamping means and for positioning a clamped pipe transversely relative to said vertical cutter head, said pipe positioning means including cylindrical spool means freely rotatably journaled but axially fixed on said shaft member, co-actingly operative thread means interengaging said spool means and essentially said base structure, and manually operable lever means secured to said spool means for rotating said spool means for causing axial displacement of said shaft and selective translational displacement of said pipe clamping means.

22. A machine for cutting a first length of pipe or the like to fit a second length of pipe or the like comprising, in combination, a base structure; pipe holding means supported from said base structure for rigidly holding a pipe in a horizontal disposition; a carriage; guide means rigidly secured to said base structure for guiding said carriage in translational vertical movement; rotary drive means including rotatable drive structure supported and fixedly journaled from said carriage, said drive means including power means for rotating said drive structure; a cutter head including a cylindrical vertically arranged tubular body rigidly secured to and in co-axial rotative arrangement with the drive structure of said drive means, said cutter head including a multiplicity of annularly arranged cutting elements substantially integrally secured to the lower end edge of said cylindrical tubular body and operative in a plane perpendicular to the axis of said tubular body; bi-directional, translationally reciprocative feed means operatively connected to said carriage for up-and-down vertical movement of said carriage and for axial displacement of said cutter head into and out of cutting engagement with said first pipe; and bracing means operatively engageable with the outer cylindrical surface of said cutter head tubular body for bracing said body against horizontal radial deflection and diametric elongation of said body; said machine being operatively adapted to form a semi-cylindrical kerf-cut transversely in said first pipe, to sever the kerf-cut portion from said pipe, and to form substantially a semi-cylindrical concave surface on said first pipe corresponding substantially in size and arc to the size and arc of the outer cylindrical surface of said second pipe; the concave kerf-cut surface of said first pipe being adapted to be match-joined to the convex cylindrical outer wall surface of said second pipe, said bracing means including a vertically adjustable fixedly securable generally horizontal brace member supported essentially from said base structure, said brace member including frame structure defining a substantially circular vertically opening through aperture, and a plurality of circularly arranged angularly spaced bearing members rotatably supported individually from said base member frame structure and disposed around the inward side of said circular aperture, said brace member frame structure being disposed circumferentially around the vertically arranged tubular body of said cutter head with the bearing surfaces respectively of said plurality of bearing members engaging the outer cylindrical surface of said tubular body, the rotatable cutter head being firmly journaled against horizontal radial deflection by said brace member but freely movable axially and vertically in said brace member.

23. A machine for cutting a first length of metal pipe or the like to fit a second length of metal pipe or the like comprising, in combination, a base structure; pipe holding means supported from said base structure for rigidly supporting and holding a pipe in a horizontal disposition; a carriage, guide means rigidly secured to said base structure for guiding said carriage in translational vertical movement; rotary drive means including rotatable drive structure supported and fixedly journaled from said carriage, said drive means including power means for rotating said drive structure; a cutter head including a cylindrical vertically arranged exposed tubular body rigidly secured to and in co-axial rotative arrangement with the drive structure of said drive means, said cutter head including a multiplicity of annularly arranged cutting elements substantially integrally secured to the lower end edge of said cylindrical tubular body and operative in a plane perpendicular to the axis of said tubular body; bi-directional, translationally reciprocative feed means operatively connected to said carriage for up-and-down vertical movement of said carriage and for axial displacement of said cutter head into and out of cutting engagement with said first pipe; means responsive to axial movement of said cutting head for providing yieldable resistance to the movement of said cutting heads towards said cutting engagement with said first pipe to prevent excessive digging in of said teeth into said first pipe; and bracing means operatively engageable with the outer cylindrical surface of said cutter head tubular body for bracing said body against horizontal radial deflection and diametric elongation of said body; said machine being operatively adapted to form a semi-cylindrical kerf-cut transversely in said first pipe, to sever the kerf-cut portion from said pipe, and to form substantially a semi-cylindrical concave surface on said first pipe corresponding substantially in size and arc to the size and arc of the outer cylindrical surface of said second pipe; the concave kerf-cut surface of said first pipe being adapted to be match-joined to the convex cylindrical outer wall surface of said second pipe, said bi-directional translationally reciprocative feed means including means operative in response to downward axial displacement of said cutter head for dispensing lubricating fluid to the cutting elements of the cutting head and to the pipe material being acted upon simultaneously with the providing of said yieldable resistance to provide simultaneously operative dual means, said simultaneously operative dual means including reciprocatively operative pump means including a source of fluid, conduit means for conducting the fluid from said pump means to said cutter head, linkage means for transmitting movement from said cutter head to said pump means and for expelling fluid from said pump means and through said conduit means upon downward displacement of said cutter head, and means included in said conduit means for restricting the passage of fluid and for metering the amount of fluid dispensed, said conduit means including means for dispensing the lubricating fluid into the hollow interior of said cylindrical vertically arranged tubular body of said cutter head.

References Cited

UNITED STATES PATENTS

| | | | |
|---|---|---|---|
| 688,374 | 12/1901 | Wilcox | 144—205 |
| 887,308 | 5/1908 | Bryan | 77—42 |
| 1,469,368 | 10/1923 | Thacher | 77—55.3 |
| 3,169,415 | 2/1965 | Welty | 77—42 |
| 3,333,488 | 8/1967 | DeWitt | 77—69 XR |

FOREIGN PATENTS

| | | |
|---|---|---|
| 803,815 | 4/1951 | Germany. |
| 10,267 | 1898 | Great Britain. |
| 299,127 | 10/1928 | Great Britain. |

FRANCIS S. HUSAR, *Primary Examiner.*

U.S. Cl. X.R.

77—55, 69; 143—85; 269—242